United States Patent [19]
Dutta

[11] Patent Number: 5,313,493
[45] Date of Patent: May 17, 1994

[54] PLURAL-DIFFERENTIAL, PHASE-SHIFT-KEYED MODULATION, COMMUNICATION SYSTEM

[75] Inventor: Santanu Dutta, Cedar Rapids, Iowa

[73] Assignee: Rockwell International Corporation, Seal Beach, Calif.

[21] Appl. No.: 532,283

[22] Filed: Jun. 1, 1990

[51] Int. Cl.$^5$ .......................................... H04L 27/10
[52] U.S. Cl. ........................................ 375/56; 375/84
[58] Field of Search ..................... 375/84, 86, 56, 27

[56] References Cited

U.S. PATENT DOCUMENTS

| | | | |
|---|---|---|---|
| 4,481,640 | 11/1984 | Chow et al. | 375/56 |
| 4,628,271 | 11/1984 | Takayama | 375/56 |
| 4,922,206 | 5/1990 | Nicholas | 375/84 |
| 5,007,068 | 4/1991 | Simon et al. | 375/56 |

OTHER PUBLICATIONS

Spilker, J. J., *Digital Communications by Satellite*, Prentice-Hall, 1977, pp. 331-335.
Henley, S. J., "Modem for the Land Mobile Satellite Channel" Conf. Proc., NASA/JPL Mobile Satellite Conference, May 3-5, 1988, JPL Pub. #88-9, pp. 323-328.
Simon, M. K. & Divsalar, D., "Doppler-Corrected Differential Detection of MPSK", IEEE Trans., vol. 37, No. 2 Feb. 1989, pp. 99-109.
Schoppe, W. J., "The Navy's Use of Digital Radio", IEEE Trans., vol. COM-27, Dec. 1979.
Gardner, F. M., *Phaselock Techniques*, Pub. 1979, by John Wiley & Sons, Inc., New York, N.Y., pp. 230-251.
Haykin, S., *Communication Systems*, Pub. 1983, by John Wiley, New York, N.Y., pp. 80-84.

*Primary Examiner*—Stephen Chin
*Assistant Examiner*—T. Ghebretinsae
*Attorney, Agent, or Firm*—Gregory G. Williams; M. Lee Murrah; H. Fredrick Hamann

[57] ABSTRACT

A plural-differential phase shift keying (PDPSK) communication system has a transmitter (22) for encoding digital data as plural differentials of phase between successive pairs of channel symbols of a carrier, and a receiver (24) with a plurality of phase differential detectors (32, 48) connected in cascade for determining the plural differentials of phase of the incoming signals to achieve a bit error rate independent of frequency offsets and thereby an improved rate of signal acquisition.

17 Claims, 5 Drawing Sheets

FIG. 1A  PRIOR ART

| DATA IN | 1 | 0 | 1 | 1 | 0 | 0 | 0 | 1 |
|---|---|---|---|---|---|---|---|---|
| BPSK MOD. | π | 0 | π | π | 0 | 0 | 0 | π |
| DPSK MOD. | φ | φ+π | φ+π | φ | φ+π | φ+π | φ+π | φ+π | φ |

FIG. 1B  PRIOR ART

| BPSK CH. SYMBOLS | π | 0 | π | π | 0 | 0 | 0 | π |
|---|---|---|---|---|---|---|---|---|
| BPSK DATA DATA | 1 | 0 | 1 | 1 | 0 | 0 | 0 | 1 |
| DPSK CH. SYMBOLS | φ | φ+π | φ+π | φ | φ+π | φ+π | φ+π | φ+π | φ |
| 1ST DIFF. OF PHASE | π | 0 | π | π | 0 | 0 | 0 | π |
| DPSK DATA OUT | 1 | 0 | 1 | 1 | 0 | 0 | 0 | 1 |

FIG. 3A

| DATA IN | | 1 | 0 | 1 | 1 | 0 | 0 | 0 | 1 |
|---|---|---|---|---|---|---|---|---|---|
| DDPSK MOD. | φ | φ | φ+π | φ | φ | φ+π | φ | φ+π | φ+π | φ |

FIG. 3B

| DDPSK CH. SYM. | φ | φ | φ+π | φ | φ | φ+π | φ | φ+π | φ | φ |
|---|---|---|---|---|---|---|---|---|---|---|
| 1ST DIFF. OF PHASE | 0 | π | π | 0 | π | π | π | π | 0 |
| 2ND DIFF. OF PHASE | | π | 0 | π | π | 0 | 0 | 0 | π |
| DDPSK DATA OUT | | 1 | 0 | 1 | 1 | 0 | 0 | 0 | 1 |

FIG. 3C

| DATA BIT (#i) | PHASE SHIFT BETWEEN BIT (i-1) & BIT (i-2) | PHASE SHIFT BETWEEN BIT (i) & BIT (i-1) |
|---|---|---|
| 0 | 0 | 0 |
| 0 | π | π |
| 1 | 0 | π |
| 1 | π | 0 |

| DATA IN | | 10 | 11 | 00 | 01 |
|---|---|---|---|---|---|
| QPSK | | π | 3π/2 | 0 | π/2 |
| DQPSK | φ | φ+π | φ+π/2 | φ+π/2 | φ+π |
| 1ST DIFF | | π | 3π/2 | 0 | π/2 |
| DDQPSK | φ φ | φ+p | φ+3π/2 | φ | φ+π |
| 1ST DIFF | 0 | π | π/2 | π/2 | π |
| 2ND DIFF | | π | 3π/2 | 0 | π/2 |

FIG. 2
*PRIOR ART*
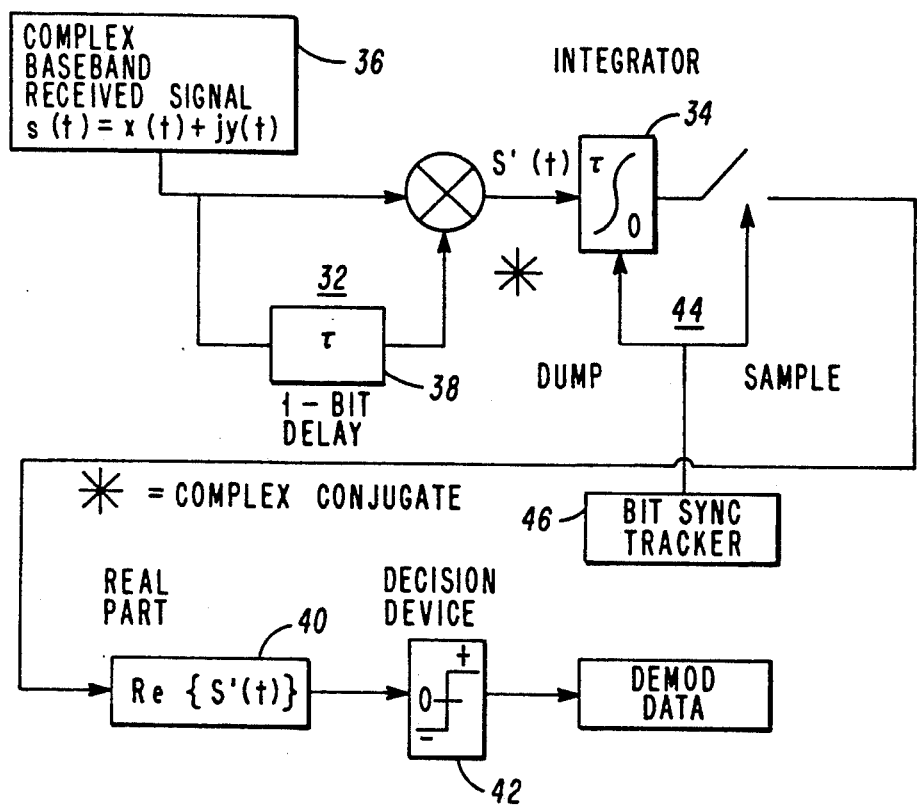
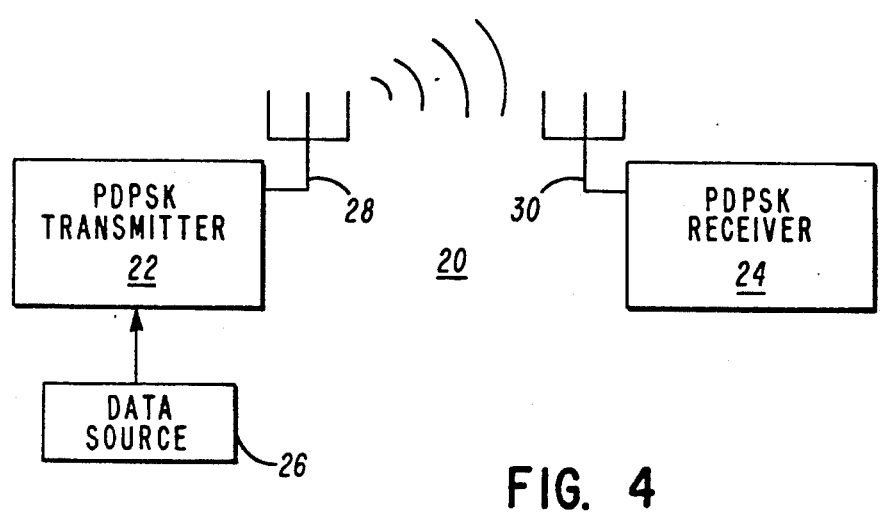
FIG. 4

τ = 1 - BIT DELAY

PLURAL-DIFFERENTIAL, PHASE-SHIFT-KEYED MODULATION, COMMUNICATION SYSTEM

BACKGROUND OF THE INVENTION

1. Technical Field

The invention relates to a phase shift keying communication system and, more particularly, to a differential phase shift keying system.

2. Description of the Related Art

Two well known phase shift keying communication systems are binary phase shift keying, or BPSK, and differential phase shift keying, or DPSK. Referring to FIG. 1, the encoding scheme for both BPSK and DPSK systems are illustrated with respect to encoding the binary data sequence 1011001. In the case of BPSK, the carrier phase angle (with respect to an arbitrary reference) is 0 if the data bit is 0 and $\pi$ if the bit is 1. In the case of DPSK, the carrier phase of a given channel symbol is the same as that of the previous symbol if the data bit is 0, and shifted by $\pi$ with respect to the previous symbol if the data bit is 1. Also, one extra symbol is required at the beginning of each transmission in the DPSK system to provide a phase reference for the first data bit. As seen in FIG. 1A, the data is mapped onto the absolute phase of the channel symbol in the case of BPSK, and the phase shift between adjacent symbols in the case of DPSK. Note that DPSK encodes the input data onto the first difference of the phase between adjacent channel symbols.

In DPSK systems, the performance is sensitive to receiver frequency offsets and thus, automatic frequency control circuits are required. As these circuits usually have long settling times, rapid acquisition is not obtainable, which is particularly problematic for the reception of short data packets. This frequency sensitivity of DPSK is explained in detail in Spilker, J. J., *Digital Communication by Satellite*, Prentice-Hall, 1977, pp. 331–335. Briefly, the phase shift between adjacent symbols in a received DPSK signal depends not only on the impressed modulation at the transmitter but also on the offset of the received carrier frequency relative to the transmitted carrier frequency (multiplied by the symbol duration).

FIG. 2 shows the block diagram of a prior art DPSK demodulator. The block diagram uses complex baseband signal representation, which assumes the presence of an I/Q-splitting device such as a Hilbert transformer or quadrature downconverter as a preprocessor.

In addition to the binary encoding schemes illustrated by FIGS. 1A and 1B, there are also higher order digital modulation schemes. These are often referred to as M-ary modulation, where M is usually a power of two, e.g. M=4, 8, 16, etc. In M-ary PSK using coherent demodulation, groups of n-bits are collected to form n-bit words. These words then modulate the carrier phase in each channel symbol by selecting one of $2^n$ possible phases uniformly distributed between 0 and $2\pi$ radians. For example, in quadrature phase shift keying (QPSK), n=2 and the phases selected are 0, $\pi/2$, $\pi$ and $3\pi/2$, as shown in FIG. 1C. In DQPSK (single-differential quadrature phase shift keying), the phase shifts are selected similarly, but, unlike QPSK which uses coherent demodulation, the reference for each phase shift in DQPSK is the phase of the previous symbol. In QPSK, the reference phase is that of the unmodulated carrier of the transmitter, which has to be regenerated at the receiver.

Several techniques for overcoming the problem of frequency offset sensitivity in DPSK (as well as M-ary differential phase shift keying) have been attempted. In one technique, a pilot signal is transmitted along with the desired signal to facilitate frequency offset estimation at the receiver. If possible, the pilot signal is transmitted in-band with the desired signal so that separate RF/IF sections are not required for reception of the pilot signal. An example of this approach is the HF Kineplex (Navy TADIL-A Link 11) system, where one tone (at 650 Hz) in a multitone, voiceband, differential QPSK system is reserved for Doppler correction as described in Schoppe, W. J., "The Navy's Use of Digital Radio", IEEE Trans. Vol. COM-27, December, 1979. Disadvantageously, use of a separate pilot signal wastes transmitted signal power and violates the constant amplitude signal characteristic, which is desirable in communication systems using nonlinear amplification.

In another known technique, an automatic frequency control feedback loop is used to correct the frequency offset in DPSK. The frequency accuracy requirement is not very critical; the residual frequency offset must be small compared to the inverse of the bit period, as explained in Spilker, J. J., *Digital Communications by Satellite*, Prentice-Hall, 1977, p. 334. Typical techniques used are FFT and the quadrature component of the output of a complex differential detector, as described in Henley, S. J., "Modem for the Land Mobile Satellite Channel", Conf. Proc., NASA/JPL Mobile Satellite Conference, May 3–5, 1988, JPL Publ. No. 88-9, pp. 323–328. Disadvantageously, in the demodulation of short data bursts, sufficient time may not be available for the AFC loop to reach its steady state. Fast response in the AFC loop, as in any feedback loop, is obtained by widening the loop bandwidth, which results in greater error in the frequency estimate.

It is this deficiency of the closed loop approach that has led to proposals for open loop approaches. A feedforward technique for frequency offset compensation in DPSK demodulation, or the JPL technique, is described in Simon, M. K. and Divsalar, D., "Doppler-Corrected Differential Detection of MPSK", IEEE Transactions on Communications, Vol. 37, No. 2, February 1989, pp. 99–109. Briefly, the JPL technique involves demodulating DPSK with more complex processing than is used for conventional differential detection. The phase error due to frequency offset is estimated by measuring the phase shift at two points in time separated by half the symbol period and situated symmetrically about the center of the symbol period. This phase shift value is measured for each symbol, over many symbols, and the sequence of values is digitally lowpass filtered to minimize the estimation error. The filtered phase shift estimate is then used to correct the phase of the complex signal at the output of the differential detector prior to bit decisions.

The JPL technique involves an averaging period for phase error estimation that spans several symbols, which limits the acquisition speed of this scheme. Performance degradation using the JPL technique for small averaging times can be substantial. For an averaging time equal to the ten symbols, the degradation is approximately 2.5 dB. Moreover, the JPL technique requires substantial amounts of complex processing.

Another technique is shown in U.S. Pat. No. 4,922,206 of Nicholas issued May 1, 1990, entitled "Method of Demodulation Using Split Delay Line" in which phase error due to frequency offset is reduced by using a pair of split delay lines, each of which provides a delay equal to half of the symbol duration. This technique can be considered as a network of three differential detectors. The first stage generates two signals each of which is the result of differential detection across points separated by half the signal duration. The second stage detects the differential between the above two signals. However, this technique does not and cannot use full-symbol integration after the first stage of differential detection because that would require integration across a symbol boundary which could lead to signal cancellation. Accordingly, the noise sensitivity performance is significantly degraded.

SUMMARY

Throughout this document, the term DDPSK (Double Differential Phase Shift Keying) is to be construed as a specific case of PDPSK (Plural Differential Phase Shift Keying) where the plurality is two. It is, therefore, the principal object of the present invention to provide a plural-differential phase shift keyed, or PDPSK, communication system, which is inherently substantially insensitive to frequency offsets and has improved signal acquisition times while avoiding the complexity and other disadvantages of the prior art systems noted above. Automatic frequency control required in DPSK systems are eliminated, and the rapid signal acquisition enables advantageous demodulation of short data packets. Unlike the DPSK system, in which each bit is encoded as a first order phase differential between a single pair of adjacent channel symbols, the PDPSK system of the present invention encodes each bit as a higher order phase differential involving a plurality of channel symbols. Digital data bits are modulated either singly (binary modulation) or in groups (M-ary modulation) onto the plural-differentials of phase between a multiplicity of channel symbols.

This objective is achieved in part through provision of a plural-differential, phase shift keying, digital communication system, comprising a plural-differential phase shift keying transmitter for the transmission of a carrier with each of a succession of data bits of a digital signal encoded therein as plural-differentials of phase between a plurality of channel symbols of the carrier, and a plural-differential phase shift keying receiver for decoding the plurality of phase differentials into the digital signal encoded by the transmitter.

The plural-differential phase shift keying transmitter has a plural-differential phase shift keying modulator for encoding digital data with means for accepting individual bits of the data and means responsive to the accepting means for selectively phase shifting a carrier to produce a series of channel symbols having phase differences between selected groups of channel symbols that are representative of different bits of the digital data being encoded.

The plural-differential phase shift keying receiver has a plural-differential phase shift keying demodulator having means including a plurality of differential stages for determining the phase differences between a plurality of channel symbols of a plural-differential phase shift keying transmission of digital data and means responsive to said plurality of differential stages for decoding the digital data.

In the preferred embodiment, each bit of a binary signal is encoded as the differential between two successive phase differentials formed by a group of three channel symbols. At the transmitter, a pair of reference phase signals are generated at the beginning of each transmission to provide a reference for the first bit of the transmission, but thereafter, the phase reference for each channel symbol is the phase differential between the two immediately prior channel symbols.

BRIEF DESCRIPTION OF THE DRAWINGS

The foregoing objects, features and advantages will be explained in greater detail and other objects, features and advantages will be made apparent from the following detailed description of the preferred embodiment which is given with reference to the several figures of the drawings, in which:

FIG. 1A is a table showing the encoding relationships between a binary data sequence 10110001 and the channel symbols for BPSK and DPSK communication systems of the prior art;

FIG. 1B is a table showing the decoding relationships of the encoded channel symbols of FIG. 1A;

FIG. 2 is a DPSK demodulation of the prior art in which is used complex baseband signal representation;

FIG. 3A is a table showing the modulation encoding of the binary data sequence of FIG. 1, 10110001 and the channel symbols for the plural-differential PSK, or PDPSK system, of the present invention, for the specific case of plurality of two, which is designated as double-differential PSK (DDPSK);

FIG. 3B is a table showing the demodulation of the plural-differential PSK encoded channel symbols of FIG. 3A;

FIG. 3C shows a preferred phase encoding rule for the PDPSK system of the invention for a plurality of two and for the encoding of binary data;

FIG. 4 is a functional block diagram of the PDPSK communication system of the present invention;

DESCRIPTION OF THE PREFERRED EMBODIMENTS

The PDPSK technique of the present invention involves the following steps. In the modulator, the source data is encoded in plural-differentials of the carrier phase, as opposed to a single differential of the carrier phase as done in the DPSK system of the prior art. In the demodulator, at least a second stage of differential detection follows the first stage of differential detection found in conventional DPSK demodulators. As a result of the plural-stage differential detection process, the phase errors caused by fixed frequency offsets found in conventional DPSK systems are cancelled. Simulations demonstrate that the error rate performance of DPSK degrades as frequency offsets increase, while the PDPSK error rate remains unaffected.

Figures 1C, 9:
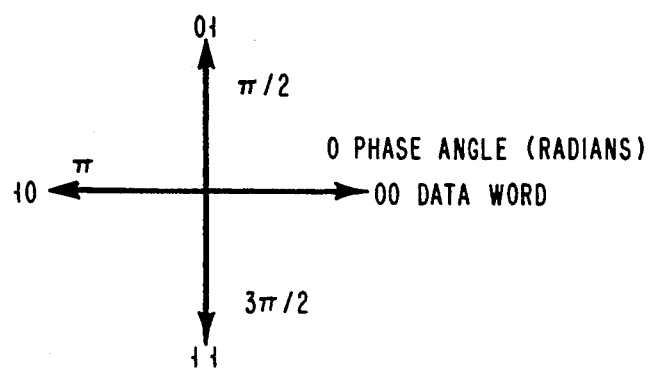
FIG. 1C shows the relationship between QPSK phase angles and input binary data words.
FIG. 9 is a table showing exemplary quadrature phase modulations for encoding the binary data words of FIG. 1C for the cases of coherent-quadrature phase shift keying (QPSK), differential quadrature phase shift keying (DQPSK), and plural-differential quadrature phase shift keying for a plurality of two (i.e. double-differential quadrature phase shift keying, or DDQPSK).

Referring to FIGS. 3A and 3B, the modulation and demodulation of the data signal 10110001, using the PDPSK system for the special case of only two phase differentials referred to again as DDPSK, is shown for contrast with the prior art modulations and demodulations of this data signal shown in FIGS. 1A and 1B and described above. As seen in this example, the carrier phase for a given data bit depends on the phases encoded for the two previous bits as well as the present data bit.

Referring to FIG. 3C, if a reference or present bit is denoted with index i, the previous bit by index (i−1) and the one before it by (i−2), then the DDPSK phase encoding rule is defined in the table of FIG. 3C for the communication of data in binary form.

As seen in the table, a 0 data bit can produce either continuity of phase shift or an unequal phase shift between one symbol and the next, while a 1 data bit can do the same. Thus, unlike DPSK, the data is not mapped onto the absolute phase shift between adjacent symbols. Instead, in the DDPSK system the data is encoded onto the difference of the phase shifts between one adjacent pair of symbols and the next adjacent pair.

Referring to FIG. 4, the PDPSK communication system 20 of the present invention includes a PDPSK transmitter 22 and a PDPSK receiver 24. The PDPSK transmitter 22 transmits a carrier with each of a succession of data bits of a digital signal from a data source 26 encoded as selected phase differentials between a plurality of channel symbols of the carrier, transmitted via an antenna 28, or otherwise, to an antenna 30, or other receiving element, of the PDPSK receiver 24. The invention has particular advantage when the transmitter 22 and receiver 24 are moving relative to one another as in a satellite mobile communication system because of the system's frequency offset insensitivity. The elements of the PDPSK transmitter 22 and PDPSK receiver 24 are conventional except for a PDPSK modulator in the transmitter and a PDPSK demodulator in the receiver. The PDPSK demodulator has means, including a plurality of differential stages, for determining the phase differences between a plurality of channel symbols of a plural-differential phase shift keying transmission of digital data, and means responsive to said plurality of differential stages for decoding the channel symbols.

Figure 5:
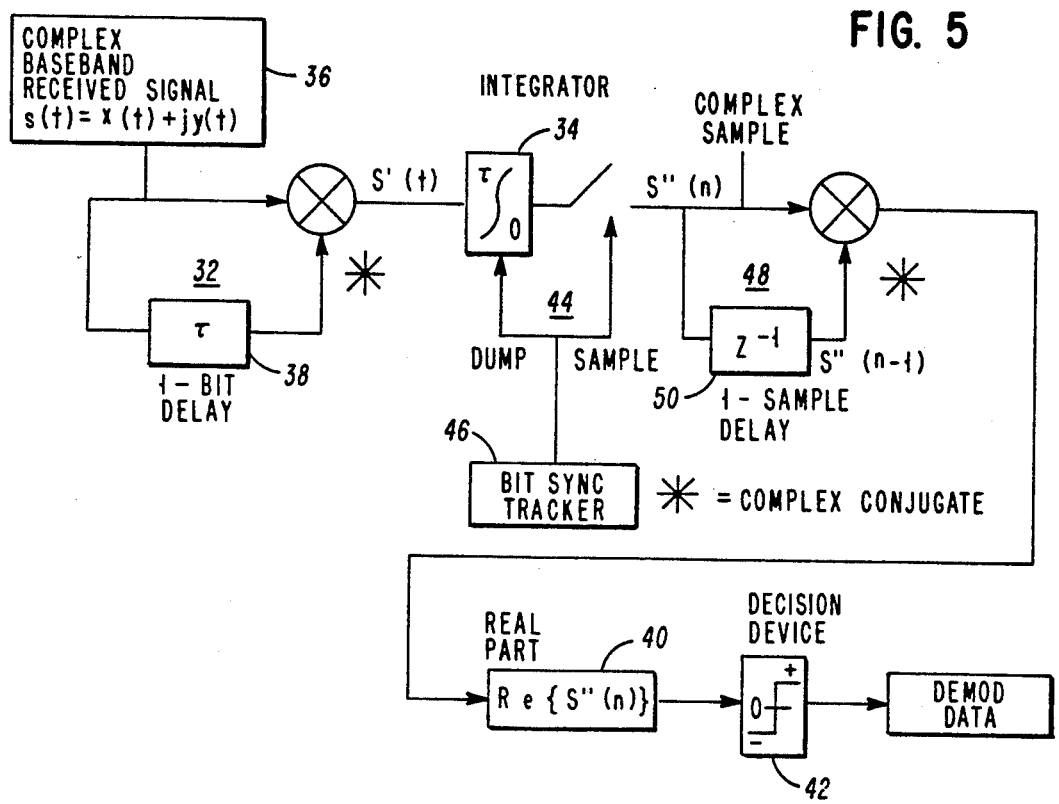
FIG. 5 is a functional block diagram of the PDPSK demodulator of the PDPSK receiver of FIG. 4 in which is used the same complex baseband signal representation as used in FIG. 2.

An exemplary PDPSK demodulator for the special case of encoding each binary symbol in two adjacent phase differentials (DDPSK demodulation) is shown in FIG. 5. Since the PDPSK demodulator is substantially the same as the prior DPSK demodulator of FIG. 2, the common parts will first be described with reference to FIG. 2. The DPSK demodulator of FIG. 2 uses single-differential detector 32 and postdetection integrator 34. However, it is also possible to use predetection integration with DPSK for improved power efficiency. The input 36 is a complex baseband signal which is obtained by quadrature downconversion of an IF signal to nominally 0 Hz (i.e., DC). If the IF bandwidth preceding the demodulator is W Hz, the complex signal has a spectrum that extends from −W/2 to +W/2 Hz, centered on 0 Hz, with the negative-frequency part of the spectrum independent of that of the positive-frequency part. Because of Doppler shifts and transmitter/receiver tuning errors, the center frequency of the complex signal is usually not exactly 0 but some nonzero value, such as $\Delta\omega$ radians/s.

The principles of quadrature downconversion and complex baseband signal analysis are covered in many text books, such as Haykin, *Communication Theory and Signal Analysis*, pp. 80-84 and reference should be made thereto for details. Briefly, the IF signal is represented by $m(t)\cos\{(\omega+\Delta\omega)t+\theta\}$, where m(t) is the modulation envelope which, for rectangular modulation, is simply +/−1 (depending on the data). The inphase and quadrature component of the complex signal, $s(t)=x(t)+jy(t)$, are given by:

$$x(t)=m(t)\cos(\Delta\omega\cdot t+\theta)$$

$$y(t)=m(t)\sin(\Delta\omega\cdot t+\theta)$$

The complex signal can also be represented as:

$$s(t)=m(t)\exp\{j(\Delta\omega\cdot t+\theta)\}$$

The signal s(t) is fed to the differential detector 32 which multiplies it with a delayed and complex conjugated version of itself from a 1-bit delay element 38, the delay being equal to the known bit period, $\tau$. The output of the multiplier is given by:

$$\begin{aligned}s'(t) &= s(t)s(t-\tau)^* \\ &= m(t)m(t-\tau)\exp[j\{\Delta\omega\cdot t - \Delta\omega\cdot(t-\tau)\}] \\ &= m(t)m(t-\tau)\exp\{j(\Delta\omega\cdot\tau)\}\end{aligned}$$

where, * denotes a complex conjugate.

The term, $m(t)m(t-\tau)$, contains the desired data information (per DPSK modulation), while the complex exponential contributes an error. It is clear that this error is caused by the frequency error, $\Delta\omega$. The effect of this error is to reduce the amplitude of the real part of $$\int_0^\tau s'(t)$$

40, upon which bit decisions by a decision device 42 are ultimately based.

The expressions of s(t) and s'(t) given above are for the case of a noiseless channel. In the presence of additive noise, both s(t) and s'(t) will have an additive complex noise component. The effect of noise is reduced by filtering s'(t) before taking bit decisions. From matched filter theory, the best filter for rectangular modulation (assumed here) is the integrate and dump device 44. This device integrates the signal and noise after aligning the integration window with the bit. The alignment is performed by a separate bit sync tracker 46 which operates on s'(t), using one of a number of standard algorithms, such as shown in Gardner, *Phaselock Techniques*, pp.230-251, Pub. 1979, by John Wiley & Sons, Inc., New York, N.Y.

The output of the integrator 34 is sampled at the end of the integration period and the real part 40 of the sampled value is fed to the decision device 42. Here, a data decision is made based on the polarity (positive or negative) of the input. The DPSK modulator selects the transmit signals such that m(t)m(t−τ) is positive for one binary symbol and negative for the other. The output of the integrator 34 is reset to zero (dumped) at the end of the integration period to avoid intersymbol interference between adjacent bits.

Like single-differential DPSK, PDPSK can use either predetection or postdetection integration (matched filtering). However, performance degradation of PDPSK by postdetection matched filtering, relative to predetection matched filtering, is much smaller than that of DPSK.

The DDPSK demodulator of FIG. 5 is identical to that of the DPSK demodulator of FIG. 2 until the integrate and dump device, or matched filter 44. The complex sample at the output of the matched filter is termed s''(n). The departure relative to DPSK demodulation consists of performing a second differential detection with a second differential detector 48 with the complex sample s''(n) before taking the real part of the output 40 and feeding it to the polarity sensitive decision device 42. It is noteworthy that the inputs to the second differential detector 48 are sampled values at the data baud rate and that there is no further integration after this detection. The notation, $Z^{-1}$ shown in the diagram for 1-sample delay device 50 of the second differential detector 48 is common in digital signal processing literature. As in the case of DPSK, polarity is an adequate decision rule after two cascaded differential detections because of the way the DDPSK modulation scheme is designed.

It is noteworthy that, in the PDPSK demodulator of FIG. 5, the input to the second stage differential detector 48 is a complex sample at the bit rate, and thus the additional computation load over DPSK demodulation is minimal.

Although accurate frequency acquisition is not required for demodulating PDPSK, bit synchronization is required, as in any other digital communication technique. Statistically, the channel symbols for DPSK and PDPSK are similar; hence, bit sync may be obtained for PDPSK using the same well known techniques as for DPSK. One way is to square both the I and Q components of the complex baseband input signal, sum the squared terms, and feed the sum through a narrow bandpass filter tuned to the bit keying rate. A phase-locked loop may also be used. In real bandpass signal representation, this would be equivalent to squaring and bandpass filtering the received signal. An alternative approach would be to provide envelope detection followed by pulse generation at the zero-crossings.

Figure 6:
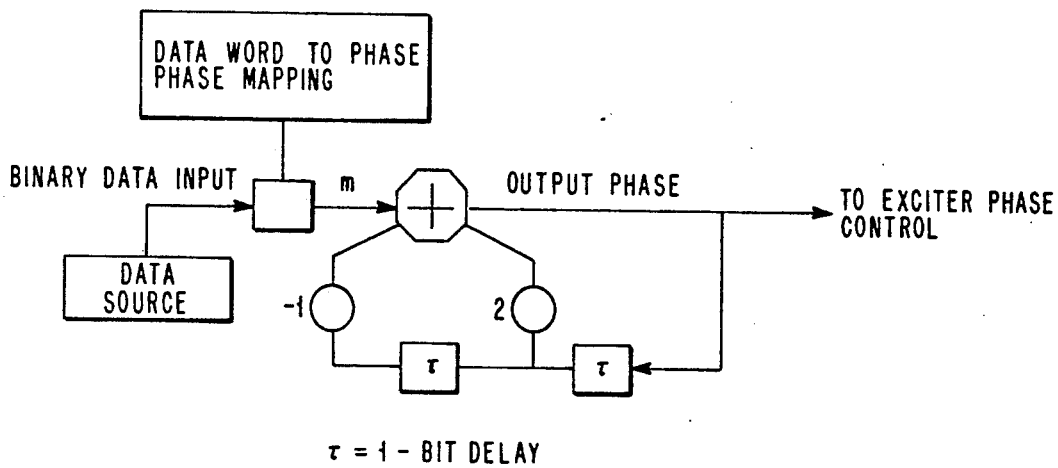
FIG. 6 is a functional block diagram of the PDPSK modulator of the PDPSK transmitter of FIG. 4 (for a plurality of two)

A preferred embodiment of the PDPSK modulator for M-ary data communication is shown in FIG. 6. The modulator shown in FIG. 6 implements the phase equation (1) for the special case of double-differential phase encoding by calculating the phase of the transmitted symbol for DDPSK as follows:

$$m = \{\phi(n) - \phi(n-1)\} - \{\phi(n-1) - \phi(n-2)\} \quad (1)$$
$$= \phi(n) - 2\phi(n-1) + \phi(n-2)$$
of $\phi(n) = m + 2\phi(n-1) - \phi(n-2)$ where
$\phi(i)$: phase of ith channel symbol;
m: phase shift (one for M values) dictated by data word (M=4 for quadriphase) for the special case of encoding in only two phase differentials (DDPSK).

In a digital signal processing, or DSP, implementation, which is the preferred implementation whenever permitted by processor capabilities, the equation is implemented in software. A hardware approach for implementing the phase equation based on logic circuits is also possible. Various ways of implementing the system illustrated in FIGS. 4, 5 and 6 should be apparent to those experienced in signal processing and logic design.

The input information for calculating the above phase equation are the data bit signal to be transmitted, or word in M-ary modulation, and the phases selected for the two previous channel symbols. The output is the phase of the present channel symbol. The system accordingly requires the storage in memory of the phases of the previous two channel symbols.

The modulator of FIG. 6 can be extended to plural-differentials greater than two by implementing the following equation (2), which is the generalized form of phase equation (1), encompassing both plural-differential and M-ary modulation.

$$m = \phi(n) + N \cdot \text{SUM}[(-1)^i \phi(n-i)] + (-1)^N \phi(n-N), \quad (2)$$
for summation over $i = 1$ to $N - 1$ or $$\phi(n) = m - N \cdot \text{SUM}[(-1)^i \phi(n-i)] - (-1)^N \phi(n-N),$$
for summation over $i = 1$ to $N - 1$ where
$\phi(i)$: phase of ith transmitted channel symbol, the present channel symbol having index, i=n;
m: phase shift selected by the data word—in M-ary modulation, m can have one of M values, where M is usually a power of 2;
N: plurality of the differential phase shift keying scheme, i.e. N=1 for DPSK, N=2 for DDPSK, N=3 for triple-differential PSK, etc.

The specific forms of equation (2) for N=1 to 4 are given below.

- $N = 1$ (*DPSK*):
  or $\phi(n) = m + \phi(n-1)$
  $N = 2$ (*DDPSK, also abbreviated $D^2PSK$*):
  or $\phi(n) = m + 2\phi(n-1) - \phi(n-2)$
  $N = 3$ ($D^3PSK$):
  or $\phi(n) = m + 3\phi(n-1) - 3\phi(n-2) + \phi(n-3)$
  $N = 4$ ($D^4PSK$):
  or $\phi(n) = m + 4\phi(n-1) - 4\phi(n-2) + 4\phi(n-3) - \phi(n-4)$ The specific forms for other values of N may be obtained similarly from equation (2).

A DDPSK transmission system will overcome the effects of fixed frequency offsets, such as that caused by the Doppler shift due to a platform moving at a constant velocity. Triple-differential PSK will overcome frequency offset errors due to a Doppler shift changing at a constant rate, such as that caused by an accelerating platform with constant acceleration. Higher order plural-differential PSK modulation/demodulation may be used to overcome frequency offset errors due to nonconstant acceleration. As DDPSK will track variations in frequency which are slow with respect to the data rate, plurality levels greater than two are unlikely to be necessary in most practical applications. It is noteworthy that higher plurality levels involve greater efficiency loss in bit error rate performance.

Figure 7:
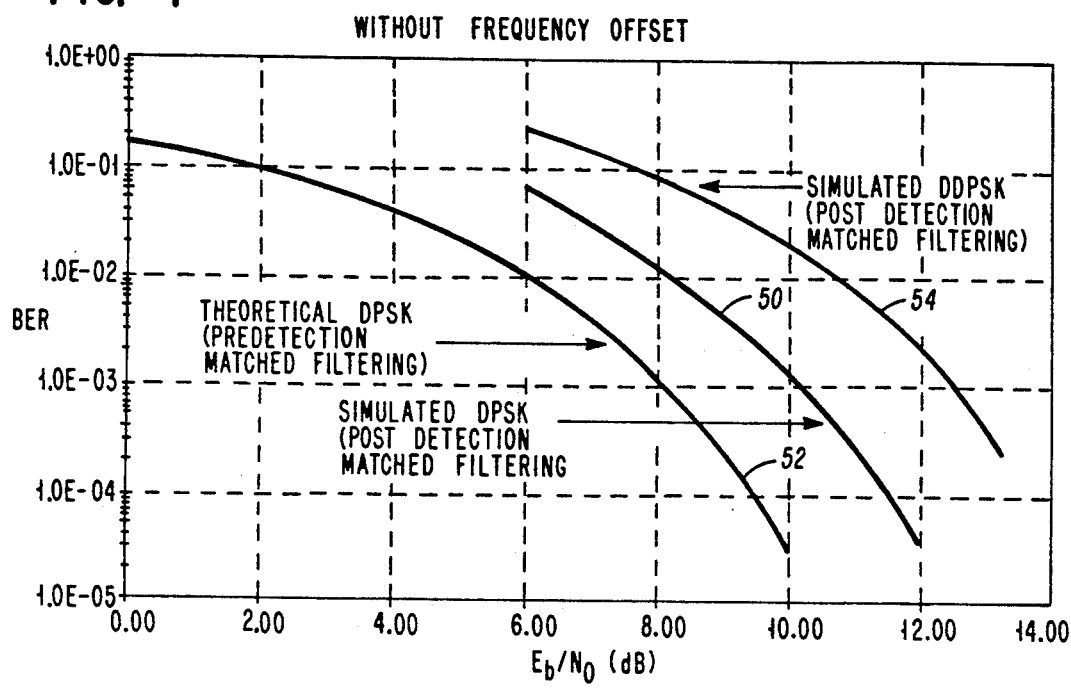
FIG. 7 is a comparative graph of theoretical noise performance of the PDPSK system of the invention (for a plurality of two) versus a DPSK system of the prior art when there is no frequency offset.
Figure 8:
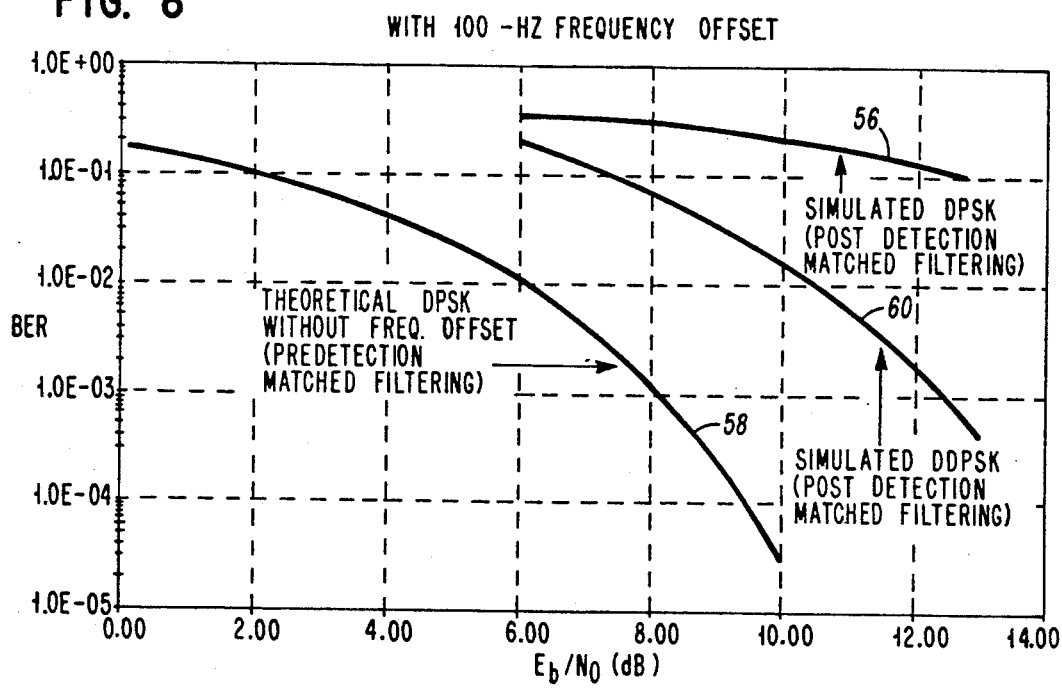
FIG. 8 is a comparative graph of theoretical noise performance of the PDPSK system of the invention (for a plurality of two) versus a DPSK system of the prior art under conditions of one hundred Hertz frequency offset, which is 20% of the data rate.

FIGS. 7 and 8 show the performance of DDPSK relative to DPSK, the results being obtained by Monte Carlo simulation. The scenario involved a sampled data system at a complex (I and Q) sampling rate of 4 kHz. The data keying rate was five hundred baud, which resulted in eight complex samples per data bit. The channel symbols were unfiltered (i.e. had rectangular envelopes) and had a programmable center frequency. Since the simulations were performed at complex baseband, the scenario of zero frequency offset was represented by a center frequency of 0 Hz while a scenario of F Hz frequency offset was represented by a center frequency of F Hz. Additive white Gaussian noise was simulated by adding to the channel-signal independent, random complex samples with bivariate (I and Q) Gaussian probability distribution and programmable variance.

FIG. 7 shows the performance without frequency offset. The three curves 50, 52 and 54 show simulated DPSK (postdetection matched filtering), theoretical DPSK (predetection matched filtering) and simulated DDPSK (postdetection matched filtering), respectively. The theoretical error rate of DPSK (predetection matched filtering), in the absence of frequency offsets, is given by:

Bit error rate (BER)=$0.5\exp(-E_b/N_0)$

Where
$E_b$: Signal energy per bit
$N_0$: Single-sided noise spectral density

The following features of FIG. 7 are noteworthy. (1) Simulated DPSK with postdetection matched filtering has an approximately 2-dB loss with respect to the theoretical DPSK modem curve which assumes predetection matched filtering. This loss is dependent on the ratio of IF bandwidth to the data rate which was eight in the case depicted in FIG. 7. In spite of the above loss, for equipment simplicity in practical systems, DPSK is sometimes operated with postdetection matched filtering (integration). Simulated DDPSK, also using postdetection matched filtering, has a 2-dB loss with respect to simulated DPSK with postdetection matched filtering and a 4-dB loss relative to ideal DPSK with predetection matched filtering. The above power efficiency ($E_b/N_0$ requirement) comparisons are made at a bit error rate (BER) of 1E-3. Like DPSK, DDPSK can also be operated with predetection matched filtering. Although the performance of DDPSK improves by approximately 0.7 dB in that case, the frequency offset insensitivity of DDPSK is lost if predetection matched filtering is used (the dependence on frequency offset is still much less than that of DPSK).

The curve 60 of FIG. 8 shows the performance of the DDPSK system in the presence of 100-Hz frequency offset (which is 20% of the data rate). The curve 58 for theoretical DPSK in the absence of frequency offsets is also shown for reference. The high error rate of simulated DPSK in the presence of frequency offset is clearly evident in curve 56. Comparing FIGS. 7 and 8, shows that the performance of DDPSK suffers virtually no degradation in the presence of frequency offset. This demonstrates the frequency offset insensitivity of the PDPSK system of this invention.

While the preferred embodiments have been discussed in detail for purposes of disclosing the best mode of practicing the invention, it should be appreciated that many changes may be made thereto without departing from the scope of the invention as defined in the appended claims. In particular, while the special case of binary modulation and demodulation using two differential detectors has been disclosed in detail, as discussed above, the PDPSK system is not limited to double differential systems or to binary modulation.

I claim:

1. A plural-differential, phase shift keyed digital communication system comprising:
    a plural-differential phase shift keying transmitter for transmission of a carrier with each of a succession of data words of a digital signal encoded therein as at least three differentials of phase between at least four channel symbols of the carrier;
    a plural-differential phase shift keyed receiver for decoding the at least three phase differentials into the data word encoded by the transmitter; and,
    said transmitter includes means for transmitting at least three reference phase signals at the beginning of each transmission of a digital signal from which a first three words of the digital signal are decoded by the receiver.

2. The plural-differential, phase shift keyed digital communication system of claim 1 in which the phases of the at least three reference signals are the same.

3. The plural-differential, phase shift keyed digital communication system of claim 2 in which
    there are at least three reference phase signals generated, and
    the digital signal is transmitted as a binary signal.

4. The plural-differential, phase shift keyed digital communication system of claim 1 in which the receiver includes a demodulator having
    means for detecting a first type of digital signal when plural-differentials of phase between a succession of adjacent channel symbols are the same, and
    means for detecting a second type of digital signal when plural-differentials of phase between a succession of adjacent channel symbols are different.

5. In a differential, phase shift, keying receiver, the improvement being a plural-differential, phase shift keying demodulator, comprising:
    means including
        a plurality of differential stages for determining the phase differences between a plurality of channel symbols of a plural-differential phase shift keyed transmission of digital data transmitted at a symbol rate, and
        a single means, connected between a first one and a last one of the plurality of differential stages, for matched filtering of the channel symbols; and
    means responsive to said plurality of differential stages for decoding the digital data.

6. The differential, phase shift keying receiver of claim 5 in which said plurality of differential stages is only two.

7. The differential, phase shift keying receiver of claim 5 in which said differential stages are connected in cascade.

8. The differential, phase shift keying receiver of claim 5, in which
- a first one of said differential stages successively determines the phase difference between first and second adjacent phase signals,
- a second one of said differential stages successively determines the phase difference between the second and a third adjacent phase signal,
- a third one of said differential stages for successively determining the differential between the phase differences detected by the first and second stages; and,
- means for integrating the outputs of the first and second differential stages.

9. The plural-differential, phase shift keyed transmitter of claim 5 in which said phase difference determining means includes:
- a digital signal processor, and in which
- the demodulator has a sampling rate for the signal which is equal to the symbol rate after a first one of said plurality of differential stages and which is greater than said symbol rate before the first one of said plurality of differential stages.

10. A plural-differential, phase shift keying digital communication system comprising:
- a plural-differential phase shift keying transmitter for transmission of a carrier with each of a succession of data words of a digital signal encoded therein as at least three differentials of phase between at least four channel symbols of the carrier;
- a plural-differential phase shift keyed receiver for decoding the at least three phase differentials into the data word encoded by the transmitter; and,
- each of said words has only one bit.

11. In a differential, phase shift, keying receiver, the improvement being a plural-differential, phase shift keyed demodulator, comprising:
means including:
- an input for receipt of a plural-differential phase shift keyed transmission of digital data transmitted at a symbol rate;
- a plurality of differential stages for determining the phase differences between a plurality of channel symbols of a plural-differential phase shift keyed transmission of digital date transmitted at a symbol rate;
- a single means connected between the input and the first one of the plurality of differential stages for matched filtering of the channel symbols; and
- means responsive to said plurality of differential stages for decoding the digital data.

12. The plural-differential, phase shift, keying receiver of claim 11 in which said phase difference determining means include:
- a digital signal processor, and in which
- the demodulator has a sampling rate for the signal which is equal to the symbol rate after said single means and which is greater than said symbol rate before the single means.

13. The plural-differential, phase shift keying receiver of claim 11 in which the plurality of differential stages is two.

14. The plural-differential, phase shift keying receiver of claim 11 in which said differential stages are connected in cascade.

15. In a double-differential, phase-shift-keying receiver, the improvement being a double-differential, phase-shift-keyed demodulator, comprising:
- an input for receiving a double-differential, phase-shift-keyed transmission of digital data;
- two sequential, differential detection levels for determining a difference between the phase differences between three channel symbols, comprising two successive pairs, of a double-differential, phase-shift-keyed transmission of digital data; wherein,
- a first differential detection level includes two differential detectors in parallel, wherein a first of said detectors is for determining a phase difference between the first of said pair of channel symbols and a second of said detectors is for determining a phase difference between the second of said pair of channel symbols,
- and a second level of differential detection having a single-differential detector operating on an output of said first level differential detectors,
- a filtering means connected to said first level differential detectors for matched filtering of the channel symbols; and,
- means responsive to the said second level differential detector for decoding the digital data.

16. A double differential, phase-shift-keying receiver, of claim 15 wherein said filtering means is connected between said input and the differential detectors of said first one of said two differential detection levels.

17. A double differential, phase-shift-keying receiver of claim 15 wherein said filtering means is connected between the differential detectors of said first one of said two differential detection levels and the differential detector of second one of said two differential detection levels.

* * * * *